(12) United States Patent
AlAmeer et al.

(10) Patent No.: US 12,553,313 B2
(45) Date of Patent: Feb. 17, 2026

(54) DRONE-BASED ACQUISITION OF WELLHEAD DATA AND WIRELESS CHOKE ADJUSTMENT

(71) Applicant: SAUDI ARABIAN OIL COMPANY, Dhahran (SA)

(72) Inventors: Mohammed Ali AlAmeer, Khobar (SA); Aqeel MohammedJalal Al-Bahrani, Hofuf (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 80 days.

(21) Appl. No.: 18/308,941

(22) Filed: Apr. 28, 2023

(65) Prior Publication Data

US 2024/0360740 A1 Oct. 31, 2024

(51) Int. Cl.
| | |
|---|---|
| *E21B 34/16* | (2006.01) |
| *B64U 10/14* | (2023.01) |
| *B64U 101/26* | (2023.01) |
| *B64U 101/30* | (2023.01) |
| *E21B 34/02* | (2006.01) |

(52) U.S. Cl.
CPC ............. *E21B 34/16* (2013.01); *B64U 10/14* (2023.01); *E21B 34/025* (2020.05); *B64U 2101/26* (2023.01); *B64U 2101/30* (2023.01)

(58) Field of Classification Search
CPC ....... E21B 34/16; E21B 34/025; B64U 10/14; B64U 2101/26; B64U 2101/30; B64U 2201/20
See application file for complete search history.

(56) References Cited

U.S. PATENT DOCUMENTS

| | | | |
|---|---|---|---|
| 5,273,112 A * | 12/1993 | Schultz | E21B 34/16 |
| | | | 166/250.07 |
| 6,817,257 B2 | 11/2004 | Kluth et al. | |
| 10,192,182 B2 | 1/2019 | Whipple et al. | |
| 10,227,859 B2 | 3/2019 | Richards et al. | |
| 10,970,590 B2 | 4/2021 | Luharuka et al. | |
| 2016/0144959 A1 | 5/2016 | Meffert | |
| 2019/0018165 A1* | 1/2019 | McManamon | G01V 1/44 |
| 2019/0106984 A1* | 4/2019 | Lee | E21B 47/11 |
| 2021/0398289 A1* | 12/2021 | Schmidt | G06T 7/13 |
| 2023/0115676 A1* | 4/2023 | Hostetter | E21B 47/10 |
| | | | 166/250.01 |
| 2024/0003242 A1* | 1/2024 | Ambade | E21B 47/008 |
| 2024/0068325 A1* | 2/2024 | Al Arji | E21B 43/12 |

* cited by examiner

*Primary Examiner* — Brad Harcourt
(74) *Attorney, Agent, or Firm* — Osha Bergman Watanabe & Burton LLP (57) ABSTRACT

In one aspect, a drone is disclosed for inspecting a wellhead having a transceiver and adjusting an electronic choke. The drone includes a plurality of propellers and a plurality of electric motors where each of the plurality of electric motors is connected to one or more of the plurality of propellers. The drone further includes a camera that captures a survey of the wellhead, a processor coupled to a memory that controls the plurality of electric motors based on the survey to position the drone within a transmission range of the transceiver of the wellhead, and a transceiver of the drone coupled to the processor that receives wellhead data from the transceiver of the wellhead and stores the wellhead data in the memory. In other aspects, a method for operating a drone and a non-transitory computer readable medium (CRM) storing instructions for performing operation of a drone are also disclosed.

17 Claims, 5 Drawing Sheets

DRONE-BASED ACQUISITION OF WELLHEAD DATA AND WIRELESS CHOKE ADJUSTMENT

BACKGROUND

Drones may be used in consumer and professional activities such as aerial photography, cartography, inspection of industrial objects, or military operations. Among these applications, a drone may be outfitted with a variety of sensor and communication packages. Drones may also be effectively utilized for surveys and remote sensor readings.

Currently, field operators are used to inspect and take wellhead data measurements in addition to performing manual choke adjustments. Thus, survey of an array of wellheads requires significant human capital, time, and vehicle expense traversing remote wellhead fields. In addition, the potential for human injury during the survey process increases over the number of wellheads surveyed.

Accordingly, utilizing one or more drones to conduct wellhead surveys and perform choke adjustments may increase efficiency while decreasing expense and the risk of potential human injury.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to drone for inspecting a wellhead having a transceiver and adjusting an electronic choke. The drone includes: a plurality of propellers; a plurality of electric motors, each of the plurality of electric motors connected to one or more of the plurality of propellers; a camera that captures a survey of the wellhead; a processor coupled to a memory that controls the plurality of electric motors based on the survey to position the drone within a transmission range of the transceiver of the wellhead; and a transceiver of the drone coupled to the processor that receives wellhead data from the transceiver of the wellhead and stores the wellhead data in the memory.

In another aspect, embodiments disclosed herein relate to method for operating a drone that adjusts an electronic choke. The method includes: flying the drone from a plant to a field; scanning the field to determine a location of one or more wellheads; selecting a wellhead of the one or more wellheads and flying the drone to the wellhead; capturing a survey of the wellhead; flying the drone to align the drone within a transmission range of a transceiver of the wellhead based on the survey; receiving wellhead data from the transceiver; and storing the wellhead data in a memory of the drone.

In another aspect, embodiments disclosed herein relate to non-transitory computer readable medium (CRM) storing instructions for performing operation of a drone that adjusts an electronic choke. The operation includes: flying the drone from a plant to a field; scanning the field to determine a location of one or more wellheads; selecting a wellhead of the one or more wellheads and flying the drone to the wellhead; capturing a survey of the wellhead; flying the drone to align the drone within a transmission range of a transceiver of the wellhead based on the survey; receiving wellhead data from the transceiver; and storing the wellhead data in a memory of the drone.

Other aspects and advantages of the claimed subject matter will be apparent from the following description and the appended claims.

DETAILED DESCRIPTION

In the following detailed description of embodiments of the disclosure, numerous specific details are set forth to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-6, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Drones are useful devices in the oil and gas industry for inspection or surveillance of oil and gas assets. For example, an oil and gas asset may be a wellhead with various gauges and sensors for monitoring status. An operator may fly a drone to one or more wellheads to monitor the status of a wellhead including various pressure and temperature readouts or any other aspect that requires inspection. In addition, the drone may be utilized to perform visual inspection of the wellhead site.

One or more embodiments disclosed herein provide a drone that can be flown to a remote field of one or more wellheads to capture data relating to wellhead status. In addition, one or more embodiments facilitate communication of the drone with the wellhead to remotely control a choke of the wellhead. The drone may be piloted by an operator or may perform wellhead survey(s) and choke control(s) programmatically.

Figure 1:
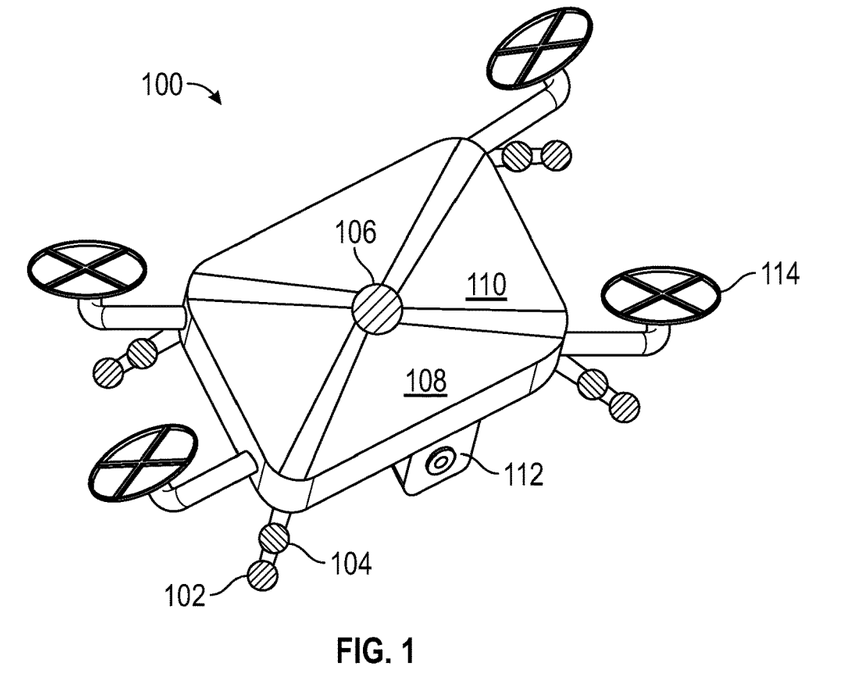
FIG. 1 shows a drone in accordance with one or more embodiments.

FIG. 1 shows an example of a drone (100) according to one or more embodiments. The drone (100) includes a transmitter (102), a receiver (104), a memory (106), and a processor (108). In some embodiments, the transmitter (102) and receiver (104) may be operatively combined and referred to collectively as a transceiver. In some embodiments, the drone (100) may have multiple transmitters (102) and multiple receivers (104) that may employ various wireless communication technologies such as Bluetooth, Wi-Fi, and other suitable technologies compatible with communicating control and data signals to and from the drone (100). In addition, the memory (106) may be fixed or may be one or more forms of removable media. The processor (108) may be one or more processors or may include one or more processing subsystems.

The drone (100) further includes a camera (112). The camera (112) may capture still images, video, or any combination thereof. Further, the camera (112) may also take the form of other types of imaging sensors such as infrared, acoustic, and other applicable sensors useful for navigation and the survey of fields containing one or more wellheads. Moreover, the camera (112) may take the form of one or more proximity sensors to, for example, align the drone with a particular wellhead or electronic gauges of the wellhead. Alternatively or additionally, the processor (108) may perform image processing on one or more streams from the camera (112) to assess the environment of a field or surrounding one or more wellheads.

The drone (100) further includes a battery (110) and propellers (114). The battery of the drone supplies electric motors that rotate the propellers (114), and the processor (108) controls operation of the electric motors. In one or more embodiments, the battery (110) may be a lithium battery. In one or more embodiments, the battery may be an extended-life battery allowing for long range traversal between, for example, a plant and a field to survey multiple wellheads. In other words, the extended-life battery may allow the drone (100) to survey an entire field without necessitating returning to the plant for charging.

According to one or more embodiments, the electric motors of the drone (100) that rotate the propellers (114) are electrically connected to the battery (110), and a controller (e.g., a remote controller) can turn ON (i.e., rotate) and OFF (i.e., stop the rotation of) the propellers (114). Initially, the controller turns ON the propellers (114) so that an operator can fly the drone (100) to a field to survey and communicate with one or more wellheads. In some embodiments, the drone (100) may also be flown by a program stored in memory (106) and executed by the processor (108). Alternatively, in some embodiments the drone (100) may be flown by a program executed at a remote terminal such as a computer as described with reference to FIG. 6.

Figure 2:
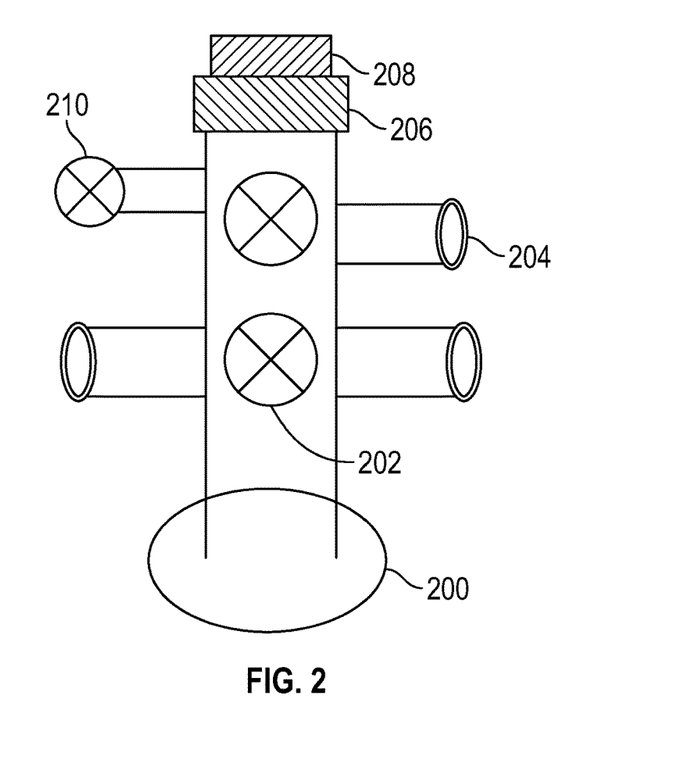
FIG. 2 shows a wellhead configuration in accordance with one or more embodiments.

FIG. 2 shows an example of a wellhead (200) configuration in accordance with one or more embodiments. The wellhead (200) may have one or more valves (202) to regulate fluid flow and one or more gauges (204) to perform measurements of the wellhead (200). In some embodiments, the gauges (204) may be electronic and have one or more wired or wireless transceivers to transmit wellhead data. In some embodiments, the gauges may measure pressure, temperature, or other annuli data.

The wellhead (200) further includes a memory (206) and a receiver/transmitter (208). In some embodiments, the receiver/transmitter (208) may be operatively combined and referred to collectively as a transceiver. In some embodiments, the wellhead (200) may have multiple transceivers (208) that may employ various wireless communication technologies such as Bluetooth, Wi-Fi, and other suitable technologies for communicating control and data signals to and from the wellhead (200). In some embodiments, the memory (206) may store commands received from the transceiver (208) or wellhead data from the gauges (204).

The wellhead (200) further includes one or more electronic chokes (210) to regulate flow within the wellhead (200). In some embodiments, the electronic choke (210) may be operatively combined with the one or more valves (202) and/or the one or more gauges (204). The wellhead (200) may receive one or more commands via the transceiver (208) to change the state of the electronic choke (210). In some embodiments, the commands may be stored in the memory (206) and executed at a determined time or when one or more parameter thresholds are met. For example, a command may establish a threshold based on the wellhead data read by the gauges (204).

Figure 3:
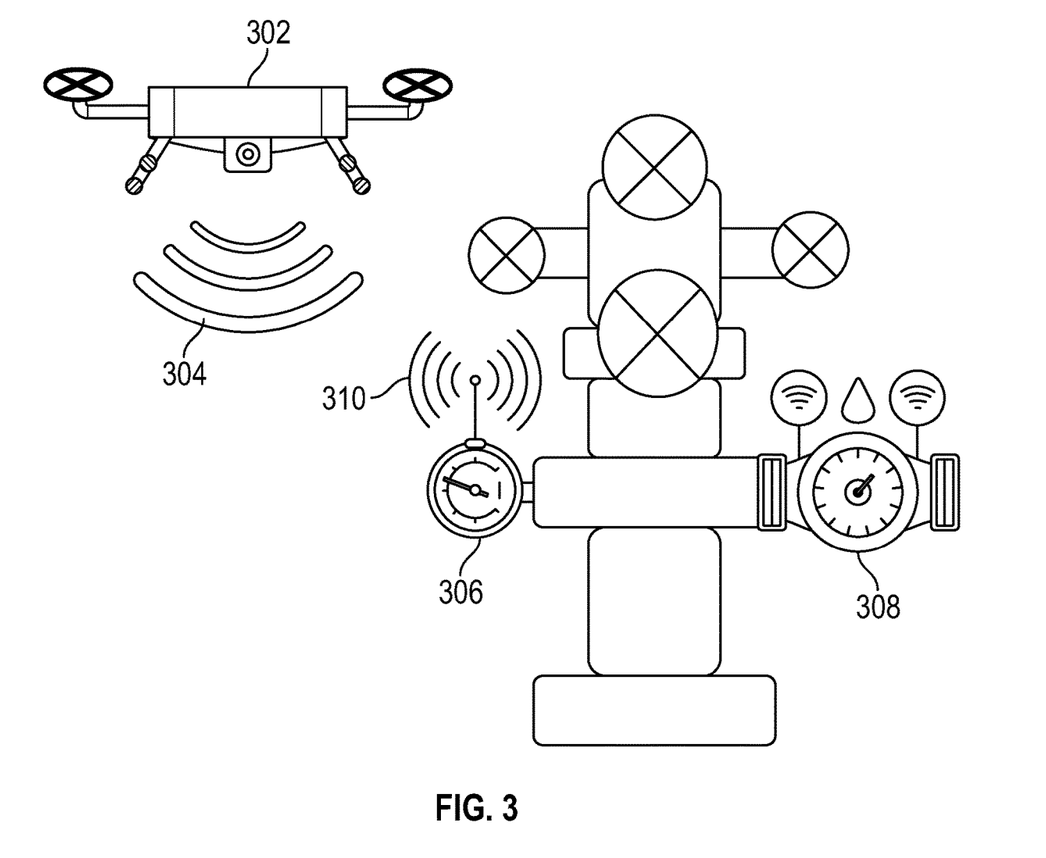
FIG. 3 shows an electronic gauge configuration in accordance with one or more embodiments.

FIG. 3 shows an example of an electronic gauge configuration in accordance with one or more embodiments. For the purposes of illustration, a simplified version of the drone (100) is shown in FIG. 3 as drone (302) with transceiver (304). In one or more embodiments, a wellhead contains one or more electronic gauges, such as electronic gauge (306) and electronic gauge (308). For example, electronic gauge (306) may further include an electronic transmitter/receiver (310). In some embodiments, the transmitter/receiver (310) may be operatively combined and referred to collectively as a transceiver. In some embodiments, the electronic gauges (306) may have multiple transceivers (310) that may employ various wireless communication technologies such as Bluetooth, Wi-Fi, and other suitable technologies for communicating control and data signals to and from the electronic gauges (306). In some embodiments, electronic gauge (308) may communicate locally with electronic gauge (306) to transmit or receive data via the transceiver (310).

In one or more embodiments in accordance with FIG. 3, the transceiver (304) or the transceiver (310) may have a range of effective communication. In other words, because the wellhead is in a fixed location the drone (302) may have to fly within the range of effective communication to transmit or receive data with the transceiver (310). The drone (302) may be flown by an operator or may execute a program to align with the transceiver (310) of the electronic gauge (306). Further, the drone (302) may utilize various sensors during the alignment process to align with the range of the transceiver (310) to effectively reduce pathloss for communication.

Figure 4:
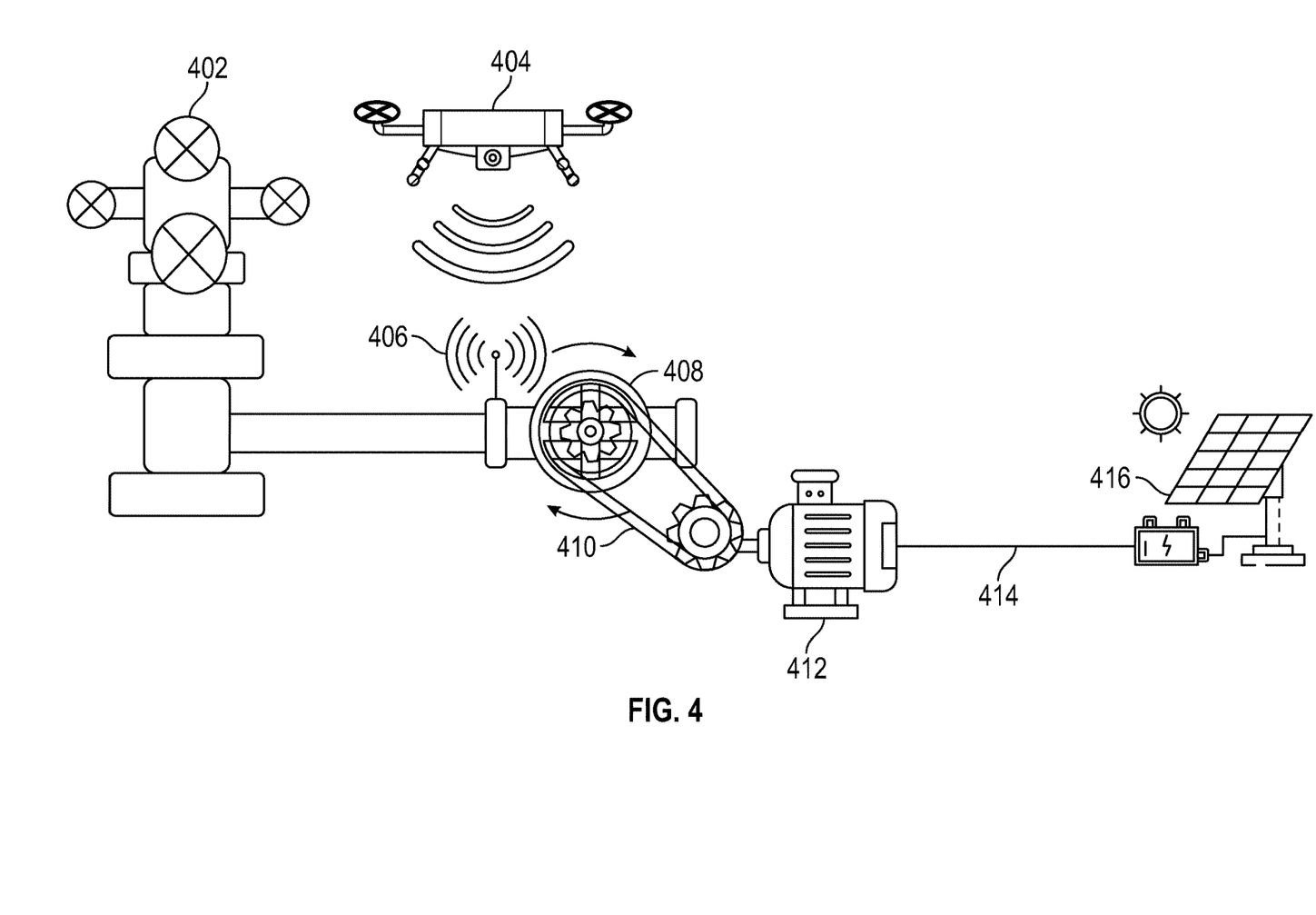
FIG. 4 shows a drone and a wellhead system in accordance with one or more embodiments.

FIG. 4 shows an example of a drone and a wellhead system in accordance with one or more embodiments. For the purposes of illustration, a simplified version of drone (100) is shown as drone (404) and a simplified version of wellhead (200) is shown as wellhead (402).

The wellhead (402) of the system includes a transmitter/receiver (406) and an electronic choke valve (408). The electronic choke valve (408) is connected by a belt and gear assembly (410) to a motor (412). The motor (412) may, for example, be an electric motor or a combustion engine. A solar panel (416) is connected by a power wire (414) to the motor (412) to supply electricity. In some embodiments, the solar panel may also be another electrical power generation source such as, for example, a windmill or a combustion engine generator.

In some embodiments, the transmitter/receiver (406) transmits and receives data and commands from the wellhead (402) and electronic choke valve (408) to the drone (404). For example, the transmitter/receiver (406) may transmit wellhead data to the drone (404) and receive a command to operate the electronic choke valve (408). The command may also instruct the motor (412) to operate, for example, clockwise or counterclockwise, to adjust the electronic choke valve (408). In some embodiments, the motor (412) and electronic choke valve (408) may also be combined so that the belt and gear assembly (410) is not required. In some embodiments, the transmitter/receiver (406) may be operatively combined and referred to collectively as a transceiver. In some embodiments, the wellhead (402) may have multiple transceivers (406) that may employ various wireless communication technologies such as Bluetooth or Bluetooth compatible, Wi-Fi, and other suitable technologies for communicating control and data signals to and from the drone (404). In some embodiments, the transceiver (406) may communicate locally with one or more electronic gauges, valves, or electronic choke valves (408).

Figure 5:
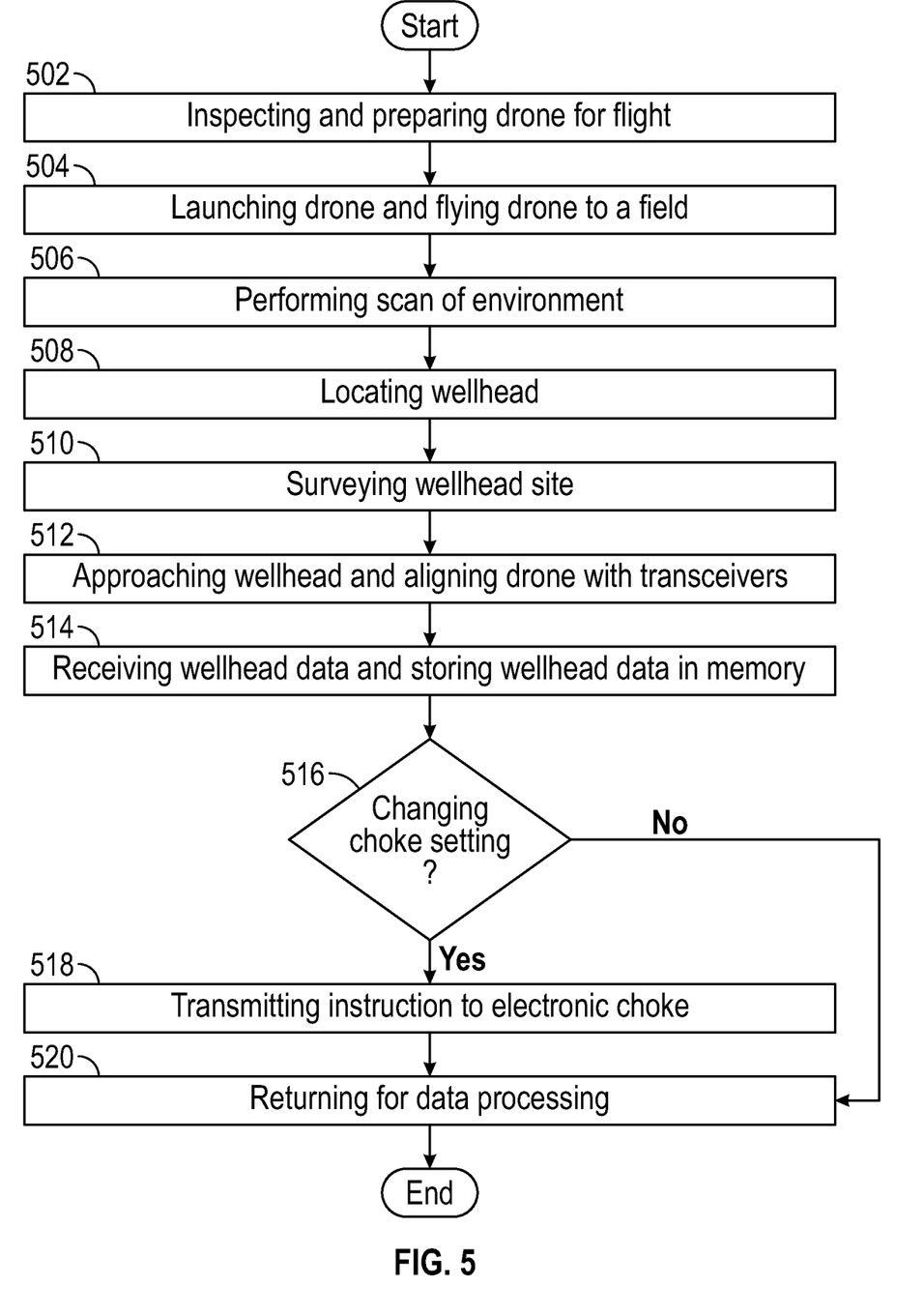
FIG. 5 shows a flowchart for a process of surveying a wellhead and adjusting a choke in accordance with one or more embodiments.

FIG. 5 shows a flowchart for an example of a process of surveying a wellhead and adjusting a choke in accordance with one or more embodiments. In one or more embodiments, one or more of the steps shown in FIG. 5 may be omitted, repeated, and/or performed in a different order than the order shown in FIG. 5. Accordingly, the scope of the invention should not be considered limited to the specific arrangement of steps shown in FIG. 5. Steps 502 to 520 shown in FIG. 5 are explained below.

In Step 502, a drone, such as the drone (100) of FIG. 1, is inspected by an operator and prepared for flight. For example, the operator may visually inspect the drone for damage to the drone body or propellers. The operator may execute various diagnostics on the drone, ensure there is sufficient free memory, ensure that the battery is attached and adequately charged, and other checks to ensure that the drone is flight ready. The operator may also swap out the memory of the drone or otherwise download any data from the memory that has not already been retrieved and processed.

In Step 504, the operator launches the drone and flies the drone from a plant or other base of operations to a location with a field of one or more wellheads. The operator may use sensors of the drone such as cameras or Global Positioning System (GPS) to direct the drone to the target location. Alternatively, the operator may initiate a program to fly the drone from the base of operations to the target location.

In Step 506, the operator uses the camera and other sensors of the drone to perform a scan of the environment at the target location. For example, the operator may use the camera of the drone to survey a field to determine the location or status of one or more wellheads. In some embodiments, survey data such as photos, videos, GPS coordinates, and other sensor reading data may be stored in the memory of the drone.

In Step 508, the operator uses the survey data to locate the positioning of one or more wellheads in the field. The operator selects one of the wellheads and flies the drone toward the wellhead site. In Step 510, one or more of the cameras and sensors of the drone are used to survey the wellhead site. For example, the operator may visually inspect the wellhead for damage or leaks. In addition, the operator may determine a path to the wellhead and whether any objects may be obstructing the path or view of the wellhead.

In Step 512, the operator flies the drone closer to the selected wellhead and begins to approach the wellhead to align the drone with one or more transceivers of the wellhead. In other words, the drone is brought into a proximity and orientation to allow effective communication with the transceivers of the wellhead. As various environmental factors affecting pathloss may impact communication between the transceiver of the drone and the transceiver of the wellhead, aligning the drone with the wellhead may be an iterative process. That is, signal strength may be evaluated during the aligning process to determine whether the drone is in range for effective transmission and reception of data and control signaling to the transceiver of the wellhead.

In Step 514, the drone receives wellhead data from the wellhead and may store the data into memory. The drone may receive the wellhead data in response to a command sent from the drone to the wellhead. The wellhead data may include status of the wellhead, readouts from one or more gauges, current status of an electronic choke, status of one or more motors, and status of one or more energy sources. Further, the wellhead data may include pressure, temperature, or annuli data. In some embodiments, the drone may transmit the wellhead data to a computer terminal to be inspected by the operator.

In Step 516, the operator determines whether to change a choke setting of the electronic choke. In some embodiments, the processor of the drone may make the determination whether to change the setting of the electronic choke. If the determination is made to change the electronic choke setting, the process proceeds to Step 518. If the determination is made not to change the electronic choke setting, the process proceeds to Step 520.

In Step 518, the drone transmits an instruction to the wellhead to change the setting of the electronic choke. The wellhead may operate a motor operatively connected to the electronic choke to adjust the choke setting based on the instruction. In some embodiments, the wellhead may transmit a confirmation signal to the drone regarding the status of the change of the electronic choke setting. In some embodiments, the wellhead may transmit additional data regarding the status of the wellhead as a result of changing the electronic choke. In some embodiments, the adjustment of the electronic choke may be an iterative process based on instructions to change the electronic choke setting and wellhead status that is fed back to the drone.

In Step 520, the operator flies the drone to return to the base of operations. In some embodiments, the drone may survey multiple wellheads before advancing to Step 520. In some embodiments, the operator may remove a removable memory from the drone or otherwise transfer wellhead data from the drone to a computer terminal for processing.

Those skilled in the art will appreciate that although the above Steps 502-520 are described with reference to an operator that such steps may also be performed programmatically. For example, the drone may store and execute instructions for performing Steps 502-520. Alternatively, a computer terminal may store a program for operating the drone in the manner described in Steps 502-520. Further, above Steps 502-520 may be performed iteratively over several fields and/or several wellheads within a field.

Further, one or more embodiments disclosed herein for operating the drone, for example with reference to FIG. 5, may be implemented on virtually any type of computer system, regardless of the platform being used. For example, the computer system may be one or more mobile devices (e.g., laptop computer, smart phone, personal digital assistant, tablet computer, or other mobile device), desktop computers, servers, blades in a server chassis, or any other type of computer system that includes at least the minimum processing power, memory, and input and output device(s) to perform one or more embodiments of the invention.

Figure 6:
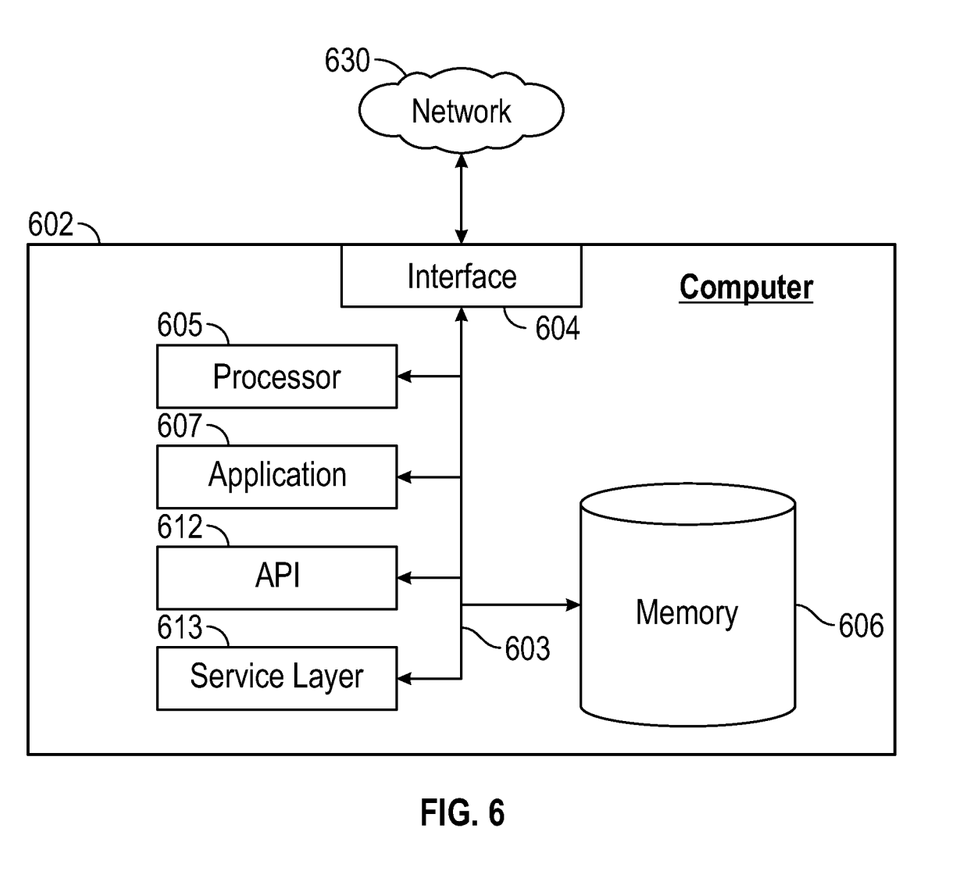
FIG. 6 shows a computer system for operating a drone in accordance with one or more embodiments.

An example of the computer system is described with reference to FIG. 6, in accordance with one or more embodiments. FIG. 6 is a block diagram of a computer system used to provide computational functionalities associated with described algorithms, methods, functions, processes, flows, and procedures as described in the instant disclosure, according to an implementation. The illustrated computer (602) in the computer system is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613)). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer (613). Software services, such as those provided by the service layer (613), provide reusable, defined business functionalities through a defined interface. For example, the interface may be software written in JAVA, C++, Python, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604) includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602). In one example, the method described with reference to FIG. 4 may be implemented by the application (607).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602). Furthermore, in one or more embodiments, the computer (602) is a non-transitory computer readable medium (CRM).

Embodiments of the present disclosure may provide at least one of the following advantages: increase of operational efficiency in surveying wellheads and adjusting electronic chokes; decreasing expense of personnel or vehicle utilization; and decreasing the risk of potential human injury.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A drone for inspecting a wellhead having a transceiver and adjusting an electronic choke, comprising:
   a plurality of propellers;
   a plurality of electric motors, each of the plurality of electric motors connected to one or more of the plurality of propellers;
   a camera that captures a survey of the wellhead;
   a processor of the drone coupled to a memory that controls the plurality of electric motors based on the survey to position the drone within a transmission range of the transceiver of the wellhead; and
   a transceiver of the drone coupled to the processor of the drone that receives wellhead data from the transceiver of the wellhead and stores the wellhead data in the memory,
   wherein the processor of the drone makes, iteratively, a determination to change an electronic choke setting of the electronic choke based on the wellhead data,
   wherein, based on the determination, the processor of the drone controls the transceiver of the drone to transmit an instruction for the electronic choke to change the electronic choke setting,
   wherein the transceiver of the wellhead transmits a confirmation signal to the transceiver of the drone regarding a status of the change of the electronic choke setting, and
   wherein the wellhead data comprises a status of one or more wellhead motors operatively connected to the electronic choke.

2. The drone according to claim 1, wherein the transceiver transmits the wellhead data to an operator.

3. The drone according to claim 2, wherein the transceiver receives an operator instruction and the processor of the drone controls the transceiver of the drone to transmit an instruction for the electronic choke to the transceiver of the wellhead based on the operator instruction.

4. The drone according to claim 1, wherein the wellhead data includes a wellhead temperature reading.

5. The drone according to claim 1, wherein the wellhead data includes annuli data.

6. The drone according to claim 1, wherein the transceiver is Bluetooth compatible.

7. The drone according to claim 1, further comprising a battery.

8. A method for operating a drone that adjusts an electronic choke, the method comprising:
   flying the drone from a plant to a field;
   scanning the field to determine a location of one or more wellheads;
   selecting a wellhead of the one or more wellheads and flying the drone to the wellhead;
   capturing a survey of the wellhead;
   flying the drone to align the drone within a transmission range of a transceiver of the wellhead based on the survey;
   receiving wellhead data from the transceiver of the wellhead;
   storing the wellhead data in a memory of the drone;
   making, iteratively, a determination to change an electronic choke setting of the electronic choke based on the wellhead data;
   based on the determination, transmitting an instruction, to the transceiver of the wellhead, for the electronic choke to change the electronic choke setting, and
   transmitting a confirmation signal regarding a status of the change of the electronic choke setting,
   wherein the wellhead data comprises a status of one or more wellhead motors operatively connected to the electronic choke.

9. The method according to claim 8, further comprising: transmitting the wellhead data to an operator.

10. The method according to claim 9, further comprising:
    receiving an operator instruction; and
    transmitting an instruction for the electronic choke to the transceiver of the wellhead based on the operator instruction.

11. The method according to claim 8, wherein the wellhead data includes a wellhead temperature reading.

12. The method according to claim 8, wherein the wellhead data includes annuli data.

13. A non-transitory computer readable medium (CRM) storing instructions for performing operation of a drone that adjusts an electronic choke, the operation comprising:
flying the drone from a plant to a field;
scanning the field to determine a location of one or more wellheads;
selecting a wellhead of the one or more wellheads and flying the drone to the wellhead;
capturing a survey of the wellhead;
flying the drone to align the drone within a transmission range of a transceiver of the wellhead based on the survey;
receiving wellhead data from the transceiver of the wellhead;
storing the wellhead data in a memory of the drone;
making, iteratively, a determination to change an electronic choke setting of the electronic choke based on the wellhead data;
based on the determination, transmitting an instruction, to the transceiver of the wellhead, for the electronic choke to change the electronic choke setting, and
transmitting a confirmation signal regarding a status of the change of the electronic choke setting,
wherein the wellhead data comprises a status of one or more wellhead motors operatively connected to the electronic choke.

14. The non-transitory CRM according to claim 13, wherein the operation further comprises:
transmitting the wellhead data to an operator.

15. The non-transitory CRM according to claim 14, wherein the operation further comprises:
receiving an operator instruction; and
transmitting an instruction for the electronic choke to the transceiver of the wellhead based on the operator instruction.

16. The non-transitory CRM according to claim 13, wherein the wellhead data includes a wellhead temperature reading.

17. The non-transitory CRM according to claim 13, wherein the wellhead data includes annuli data.

* * * * *